United States Patent
Delcroix et al.

(10) Patent No.: US 7,717,286 B2
(45) Date of Patent: May 18, 2010

(54) CRUCIBLE COVER FOR ALUMINOTHERMIC REACTION

(75) Inventors: Frederic Delcroix, Hellesmes (FR); Jean-Jacques Thuru, Saint Amand-les-Eaux (FR)

(73) Assignee: Railtech International, Raismes (FR)

( * ) Notice: Subject to any disclaimer, the term of this patent is extended or adjusted under 35 U.S.C. 154(b) by 1092 days.

(21) Appl. No.: 10/524,390

(22) PCT Filed: Aug. 12, 2003

(86) PCT No.: PCT/FR03/02512
§ 371 (c)(1), (2), (4) Date: Feb. 14, 2005

(87) PCT Pub. No.: WO2004/016385
PCT Pub. Date: Feb. 26, 2004

(65) Prior Publication Data
US 2006/0054626 A1    Mar. 16, 2006

(30) Foreign Application Priority Data
Aug. 14, 2002  (FR) .................................. 02 10347

(51) Int. Cl.
*B65D 51/16*  (2006.01)
*B65D 3/00*  (2006.01)
(52) U.S. Cl. .................... 220/371; 220/4.21; 220/366.1
(58) Field of Classification Search .................. 220/371, 220/366.1, 804, 801, 4.21
See application file for complete search history.

(56) References Cited

U.S. PATENT DOCUMENTS

| | | | | |
|---|---|---|---|---|
| 4,252,268 A * | 2/1981 | Haire | ........................ | 229/120 |
| 4,358,908 A * | 11/1982 | Song | ............................. | 47/69 |
| 4,512,498 A * | 4/1985 | Leibinger | ................... | 220/371 |
| 4,881,677 A * | 11/1989 | Amos et al. | .................... | 228/33 |
| 4,885,452 A | 12/1989 | Amos et al. | | |
| 4,889,324 A | 12/1989 | Brosnan et al. | | |
| 4,966,780 A * | 10/1990 | Hargraves et al. | ........... | 426/118 |
| 5,151,202 A * | 9/1992 | Bommart | ...................... | 249/86 |
| 5,686,127 A * | 11/1997 | Stockley et al. | ............ | 426/129 |
| 5,833,088 A * | 11/1998 | Kladders et al. | ............ | 215/248 |
| 6,419,886 B1 * | 7/2002 | Oberdorfer et al. | ......... | 422/300 |
| 6,429,408 B2 * | 8/2002 | Muskalla et al. | ............ | 219/429 |
| 6,484,792 B1 | 11/2002 | Plotz | | |
| 6,703,578 B2 * | 3/2004 | Walker et al. | .......... | 219/121.45 |
| 7,323,024 B2 * | 1/2008 | Morrell et al. | ............. | 55/385.1 |

FOREIGN PATENT DOCUMENTS

| | | |
|---|---|---|
| DE | 196 35 173 C | 4/1998 |
| DE | 198 22 851 A | 11/1999 |
| EP | 0 407 240 A | 1/1991 |

* cited by examiner

*Primary Examiner*—Anthony Stashick
*Assistant Examiner*—Niki M Eloshway
(74) *Attorney, Agent, or Firm*—Levine & Mandelbaum (57) ABSTRACT

A cover for closing a top opening of a thermite reaction chamber of a crucible is substantially continuous and is secured to an annular filter lining via a bottom peripheral edge for making contact on a top peripheral edge of the crucible. The filter lining is substantially continuous and is suitable for constituting a substantially continuous contact medium between the bottom edge and top edge. The cover is applicable, for example, to thermite welding, e.g., for use in tunnels or underground.

14 Claims, 2 Drawing Sheets

FIG.1

FIG_3

FIG_2

CRUCIBLE COVER FOR ALUMINOTHERMIC REACTION

BACKGROUND OF THE INVENTION

The present invention relates to a cover for closing a top opening of defined inside dimensions of a thermite reaction chamber of a crucible, the cover including for this purpose a bottom peripheral edge suitable for bearing against a top peripheral edge defining said top opening.

Such a cover has been proposed by the Applicant in its European patent EP 0 407 240 B1, in the context of a complete apparatus for thermite welding, the apparatus also comprising a crucible for producing metal in the liquid state by the thermite reaction, and a mold for receiving and confining said molten metal in a space between two metal parts that are to be welded together by means of said metal.

In the embodiment described in EP 0 407 240 B1, the bottom edge of the cover bears against the top edge of the crucible in a manner that is substantially continuous and substantially leaktight, and the cover is provided with vent slots opening out into a central depression of a top wall of the cover and allowing the fumes given off by the thermite reaction to escape to the atmosphere, while trapping a maximum number of particles that might be projected by the reaction.

In order to enable the crucible to be used under certain conditions in which the fumes could be harmful or even dangerous, for example in a tunnel or underground, EP 0 407 240 B1 proposes placing a filter cap on the cover, said cap covering at least the vent slots.

Such a filter cap is sold by the Applicant in a shape that is slightly different from the shape described in EP 0 407 240 B1, while nevertheless being of the same general design as that described, and when it is associated with a cover presenting the shape as described in EP 0 407 240 B1 it is recognized as being effective.

Nevertheless, it has been felt that the fume filtering technique described in EP 0 407 240 B1 could be improved, and that is the object of the present invention.

As presently manufactured and sold by the Applicant, the filter cap is in the form of a steel frustoconical chimney that flares from a bottom edge making substantially continuous leaktight contact with a peripheral rim of the crucible cover towards a top edge for releasably and interchangeably receiving a disk of refractory felt that acts as a filter between a bottom support grid secured at its periphery to the top edge of the chimney and a top retention grid that is releasably held on the chimney by spring clips.

When the welding apparatus is in use, which apparatus is in all other points identical to that described by way of preferred example in EP 0 407 240 B1, the filter cap fitted with a new refractory felt is placed on the rim of the crucible cover while the cover is separate from the crucible, and the crucible is placed on the mold, after which the thermite charge in the crucible chamber is ignited and the assembly constituted by the cover and the filter cap is placed thereon. Once the thermite reaction has terminated, the filter cap is removed from the cover and then the mold is separated from the crucible and its cover by destroying them (if they are made for single use as described in EP 0 407 240 B1), prior to destroying the mold itself in order to reveal the weld and proceed with finishing of the weld. Thereafter, the refractory felt is changed and the cap is ready for being used again on a new weld.

Nevertheless, this possibility of reusing the cap is limited insofar as the chimney becomes warped due to the temperatures to which it is subjected during the thermite reaction, and as a result it becomes progressively less suitable for standing in continuous manner on the rim of a cover, so that it starts to allow non-filtered fumes to escape between itself and the cover, and it no longer enables the filter to be positioned in repeatable manner and to be compressed between the grids, so the quality of filtering deteriorates with increasing number of uses.

In addition, the filter cap as presently made is quite heavy, weighing about 7 decanewtons (daN) to 8 daN which makes it awkward to transport from worksite to worksite, and this runs the risk of leading to cracks in the cover when it is made of agglomerated sand, as it is preferred, unless the cap is put onto the cover with a certain amount of care, and also runs the same risk of cracking the crucible when the assembly constituted by the cap and the cover is put into place thereon.

Furthermore, given the bulky nature of the cap in the vertical direction, its center of gravity is rather high and the position of the center of gravity of the assembly constituted by the crucible, its cover, and the filter cap is particularly high compared with the support given by the mold to the crucible. This drawback is particularly awkward insofar as the cover itself is quite heavy, weighing about 2.1 daN when it is made of agglomerated sand, and it too occupies a certain height, and consequently has a relatively high center of gravity, because of the disposition selected for the vent means in order to avoid as much as possible any particles being projected out from the crucible during the thermite reaction. This leads to a certain amount of instability firstly for the assembly constituted by the cover and its filter cap on the crucible, and secondly for the assembly constituted by the crucible, its cover, and its filter cap on the mold, when the crucible is supported directly by the mold as described in EP 0 407 240 B1, which means that great care needs to be taken in use, e.g. when welding rails that are canted.

The filter cap presently in use also presents the drawback of requiring a used filter and a new filter to be handled between two welding operations, which is disagreeable for welding personnel, given the nature of the materials constituting the filters. Furthermore, there is always the possibility of filter replacement being forgotten between two welding operations, i.e. of a filter being reused after it has already been partially clogged by the dust conveyed by the smoke or by particles projected through the vents of the cover, and that leads to a danger of the pressure of the gas given off by the thermite reaction lifting the filter cap, thereby making it largely ineffective, or even expelling it, thereby constituting a hazard for the welding personnel.

The same drawbacks are to be found if the metal produced by the thermite reaction in the crucible chamber is intended for applications other than welding, and the object of the present invention is to remedy at least some of those drawbacks, and in preferred implementations all of those drawbacks, independently of the intended application.

SUMMARY OF THE INVENTION

For this purpose, the present invention proposes a novel design of cover, making it possible to omit any filter cap.

More precisely, the present invention provides a cover of the type specified in the introduction, characterized in that it is substantially continuous and said bottom edge has secured thereto a filter lining that is annular, substantially continuous, and suitable for constituting a substantially continuous contact medium between said bottom edge and said top edge, defining the top opening of the crucible chamber.

Because the cover, the filter lining, and the contact means it constitutes between the cover and the crucible are all substantially continuous, they do not authorize any significant leakage of unfiltered fumes into the atmosphere, i.e. they present sufficient continuity to ensure that substantially the only way for the fumes to pass from the thermite reaction chamber in the crucible to the atmosphere is for them to pass through the filter lining, where the dust and any projected particles will be captured.

In particular, this means that:

the cover of the invention does not have any vent slots as described in EP 0 407 240 B1, but it is not impossible for it to be porous, particularly if it is made of sand agglomerated by means of a hydrophobic resin in order to make it easy to destroy after single use, thereby allowing a certain proportion of the fumes to escape, while simultaneously filtering them, or it could, for various reasons, present one or more localized holes providing only a small section for fumes to pass directly; and the filter lining is as continuous as possible and fits as continuously as possible against the bottom edge of the cover and the top edge of the crucible, e.g. by being made in the form of a prefabricated ring that is fastened as such on the cover, without excluding the possibility of a discontinuity that likewise leaves only a small section for direct passage of fumes, as could apply to a thin slot that might remain when the filter lining is made by cutting off a strip of suitable material and winding the resulting strip so as to make a loop of the material when the strip is fastened to the cover.

By not having any vent slots in the cover, as there are in the prior art as described in EP 0 407 240 B1, the cover of the invention can be shorter than the prior art cover, and in the absence of a filter cap it presents a center of gravity that is much lower than the center of gravity of the assembly constituted by the prior art cover plus filter cap as has been used until now, thereby considerably improving the stability of the cover and of the assembly it constitutes together with the crucible, which is particularly advantageous, particularly when welding railroad rails that are canted. This advantage is particularly appreciated insofar as the weight of the cover of the invention, which is substantially similar to the weight of the prior art cover when made of the same constituent material, is much less than the weight of the assembly constituted by the prior art cover plus the filter cap that has been used until now; if the cover is made of a material that makes it easy to destroy after it has been used, in particular sand agglomerated by means of a hydrophobic resin, so that the cover is used once only, then the cover of the present invention can weigh about 2.5 daN, as compared with a weight of about 9 daN to 10 daN for the assembly constituted by a prior art cover plus its filter cap.

This reduction in weight compared with the assembly constituted by the prior art cover and its filter cap makes handling much easier after the thermite reaction has been initiated, since only the cover of the invention needs to be placed on the crucible, thereby limiting the risk of the cover being put into place badly, thereby damaging either the cover or the crucible.

In spite of its center of gravity being placed lower than that of the prior art cover, the cover of the invention can nevertheless present sufficient weight to be able, solely under the force of gravity, to withstand any gas pressure that might develop inside the crucible chamber during a thermite reaction.

This weight that is much lower than that of the assembly constituted by the prior art cover together with its filter cap serves, in general, to make handling much easier when preparing a worksite, and when the cover is for single use (as is preferred), no special handling of the cover is needed after welding, with the cover being destroyed together with the crucible, which is likewise designed for single use only and can be discarded without taking special precautions, i.e. both without any risk of danger for the personnel or of harm to the environment, given the materials that are generally used.

Regardless of whether the cover of the invention is made in durable manner, i.e. is reusable, or is designed for single use only (as is preferred), such a cover, when compared with the filter cap used until now, presents the advantage of filtering the fumes by causing them to travel radially relative to an axis that is at least approximately vertical, and common to the cover and the crucible, thereby limiting the risk of the filter lining becoming clogged by dust and projected particles which tend rather to rise and become stuck to the underside of the cover. Incidentally, the cover can itself perform a filter function through its own mass, when it is porous, as is the case when it is made of sand agglomerated by means of a hydrophobic resin, with its single-use design making any clogging by deposit of dust or projected particles quite inoffensive.

In order to encourage capture of dust and projected particles by the cover, it can be given the general shape of a pot defining internally a cavity that is set back upwards from its bottom edge.

In addition, by creating a baffle between the thermite reaction chamber and said filter lining, it is possible to prevent particles that are projected during the thermite reaction from clogging or burning the filter lining locally, and for this purpose, in a preferred embodiment of the cover of the invention, provision is made for the cover to present a continuous peripheral rim going around its bottom edge inside the filter lining and projecting downwards relative to the filter lining, said rim possessing outside dimensions that are smaller than said inside dimensions of the top edge of the crucible that define the top opening of the thermite reaction chamber, so as to enable it to be engaged in said opening with clearance. Under such circumstances, the material constituting the cover proper, e.g. sand agglomerated by means of hydrophobic resin, receives and stops projections before they can reach the filter lining.

Nevertheless, it is preferable for the filter lining to present inside dimensions that are greater than said outside dimensions of the rim of the cover, e.g. that are identical to said inside dimensions of the top edge of the crucible, so as to leave between the rim of the cover and the filter lining an annular clearance, which extends the clearance that exists between the rim of the cover and the edge of the crucible around the opening of the reaction chamber, and towards which the filter lining provides all or nearly all of its circumferential dimension and of its vertical dimension for capturing dust.

The existence of such annular clearance between the rim of the cover and the filter lining can be guaranteed while the lining is being fastened to the bottom edge of the cover by providing for the bottom edge to include localized centering means for centering the filter lining relative to the rim.

Whatever the variant embodiment that is adopted for a cover of the invention, it is found that its filter lining works under well-determined conditions of compression under the known weight of the cover between the bottom edge of the cover and the top edge of the crucible, both of which are of well-defined shape. Thus, the filter characteristics provided by the filter lining are well determined, even if the filter lining is compressible, as is preferred, with the lining being made, for example, out of a fiber material selected from the group comprising felts of vitreous synthetic fibers.

In addition, when the cover of the invention is for single use only, this ensures that filter characteristics are completely repeatable from one welding operation to another, since any deformation of the cover from welding operation to welding operation is avoided. In addition, any risk of performing a plurality of welding operations using the same filter lining is excluded, as are the disadvantages inherent to handling the filters of prior art filter caps.

Obtaining effective filtering does not require any complication in the respective shapes of the top edge of the crucible and the bottom edge of the cover, both of which can advantageously be substantially plane, and the cover may in particular present a shape that is generally that of a body of revolution, as is the case for the crucible, at least in the immediate vicinity of its top edge.

Nevertheless, the area of the filter lining made available for capturing dust can be increased by providing for the bottom edge of the cover to present blind cavities that are localized circumferentially and that are distributed circumferentially, with contact between said bottom edge and the filter lining being interrupted locally in said cavities which communicate with the annular clearance that exists between the rim of the cover and the filter lining in an above-specified preferred embodiment, the cover also being closed in the direction going away from the cover rim by the bottom edge of the cover making contact on the filter lining. Each cavity thus releases an additional area of the filter lining between the bottom edge of the cover and the filter lining, which area can serve to capture dust. When the filter lining is compressible, the existence of such localized cavities, with the weight of the cover being taken up by the crucible for the most part elsewhere through the filter lining, the filter lining in the cavities is compressed to a smaller extent, thus making it possible further to increase the area of the filter lining that is made available to capturing dust, due to the apparent localized expansion of the lining, while nevertheless ensuring that permeability to the gaseous components of the fumes continues to be ensured under rigorously determined conditions by the compressibility of the filter lining, by the weight of the cover, and by the shape of its bottom face, and in particular by the size and the number of localized cavities in question.

It should be observed that a cover of the invention conserves a general design similar to that of a prior art cover as described in EP 0 407 240 B1, such that the technique for fabricating it does not present any particular difficulty compared with that for fabricating a prior art cover, and it can take the place of a prior art cover in a thermite welding apparatus that is otherwise identical to that described in EP 0 407 240 B1, even when welds are to be made under circumstances in which it was not essential in the past to use a filter cap, and in which, consequently, such a cap was not used because of the above-mentioned drawbacks, thereby making it possible under all circumstances to improve the working conditions and safety of welding personnel.

Other characteristics and advantages of a cover of the invention appear from the following description relating to a non-limiting example of embodiment, and also from the appended drawings accompanying the description.

DESCRIPTION OF THE PREFERRED EMBODIMENT

It should naturally be understood that even if the cover of the invention is shown and described below in an application where it is associated with a crucible for thermite welding of railroad rails, such a cover could be associated with a crucible for a thermite reaction, regardless of its purpose, and without thereby going beyond the ambit of the present invention. Any adaptations that might be necessary form part of the normal abilities of a person skilled in the art.

Figure 1:
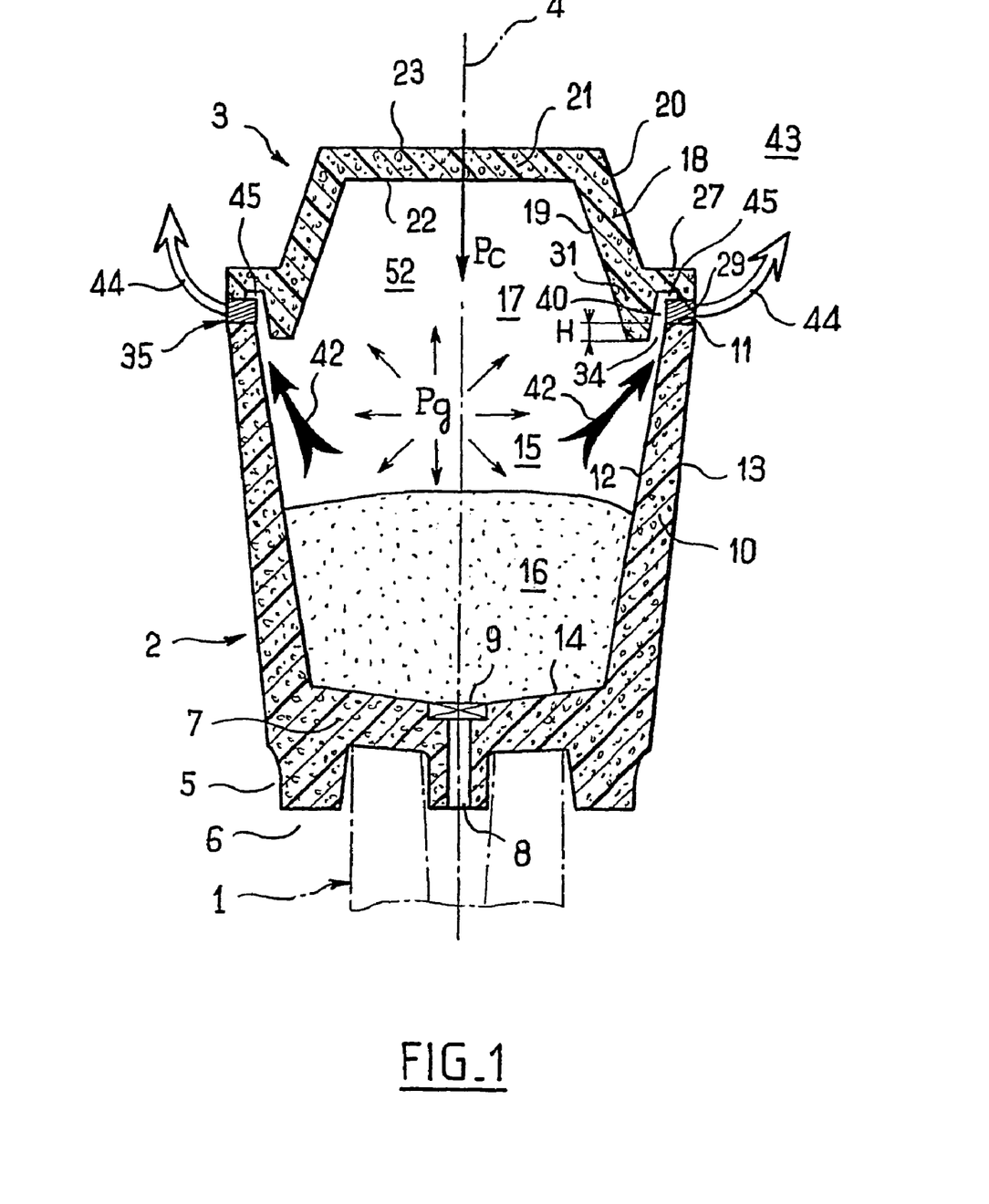
FIG. 1 is a axial section view showing a crucible for thermite welding of railroad rails, the crucible being fitted with a cover of the invention, the view being diagrammatic and in section on a plane including an axis that constitutes an axis of circular symmetry for the major portion of the crucible and the cover when it is in its position of use thereon.

FIG. 1 shows the same general structure as the thermite welding device described in EP 0 407 240 B1, comprising a mold 1 for single use, defining a cavity (not shown) around the butt-ends of two rails to be welded together (also not shown), a thermite reaction crucible 2 for producing molten metal by the thermite reaction for filling the mold cavity and welding together the two rail butt-ends, the crucible 2 being supported merely by being engaged on the mold 1, which is itself supported by the butt-ends of the rails to be welded together, and a cover 3, itself supported by being engaged on the crucible 2. The mold 1, the crucible 2, and the cover 3 present a common middle axis 4 which, in the example shown, is vertical, but which could equally well be inclined to a greater or lesser extent relative to the vertical, in particular when welding together rails of canted track, in which case the angle of inclination of the axis 4 relative to the vertical can amount to several degrees.

Ignoring a bottom portion 5 of the crucible 2, designed to be engaged on a top portion 6 of the mold 1, the crucible 2 is generally circularly cylindrical about the axis 4, in particular concerning a flat bottom wall 7 immediately adjacent to the bottom portion 5 and axially pierced by a casting hole 8 that is closed before the thermite reaction and during the initial portion thereof by a thermofusible plug 9, and a tubular peripheral wall 10 connected downwards to the bottom wall 7 and flaring progressively upwards from its connection with said bottom wall 7 to a top edge 11 that is free, annular, plane, and perpendicular to the axis 4, interconnecting an inner peripheral face 12 and an outer peripheral face 13 of the peripheral wall 10, both faces being circularly frustoconical about the axis 4 and flaring upwards. The inner peripheral face 12 of the peripheral wall 10 and a top face 14 of the bottom wall 7 define a thermite reaction chamber 15 inside the crucible 2 that contains a thermite composition 16 before the reaction, and that presents upwardly a top opening 17 surrounded by the top edge 11 going away from the axis 4 and presenting relative thereto inside dimensions, i.e. a diameter that is not referenced, determined by the diameter of the inner peripheral face 12 of the peripheral wall 10 in the immediate vicinity of its connection to the top edge 11.

This design for the crucible 2, and indeed for the mold 1, are themselves well known, and in particular they are described in EP 0 407 240 B1 to which reference can be made in this respect. The crucible 2 and the mold 1 are preferably both made out of a material that is suitable for being destroyed after single use, in particular out of agglomerated sand bonded by a hydrophobic resin such as Bakelite for single use; nevertheless, it would not go beyond the ambit of the present invention to use a crucible and/or a mold that is/are durable, i.e. suitable for performing a plurality of welding operations, with the practical embodiment of the crucible 2 and the mold 1 being unimportant with respect to the present invention.

However, while presenting dispositions that are common with the cover described in EP 0 407 240 B1, the cover 3 presents dispositions that are characteristic of the present invention, which dispositions are described below with reference to the position in which the cover is shown, i.e. in the position it occupies while it is in use, engaged on the crucible 2, which is itself engaged on the mold 1 for the purpose of performing a welding operation.

In this position, the cover 3 closes the top of the thermite reaction chamber 15 and co-operates therewith to define a volume that is large enough to allow the gases given off by the thermite reaction to develop while withstanding, under the effect solely of its own weight Pc, the pressure Pg of the gas being given off in this way in said volume, and while also allowing said gas to escape, with the dust entrained thereby being retained by filtering and by any particles that might be projected during the thermite reaction being retained by being captured directly.

To this end, and unlike the cover described in EP 0 407 240 B1, the cover 3 is substantially continuous, i.e. it does not have vent slots, and it is not necessary for it to be associated with a filter cap insofar as, in accordance with the present invention, the gas and the dust constituting the fumes produced by the thermite reaction are separated by means of filtering where the cover 3 rests against the top edge 11 of the peripheral wall 10 of the crucible 2, with this being the only filtering, ignoring possible filtering through the cover 2 itself if it should be made of a material that is porous; as is the case when in order to make it easy to destroy after single use it is made out of sand agglomerated by means of a hydrophobic resin such as Bakelite, in which case a similar effect can also be observed through the crucible 2 when it is itself made in the same way.

More precisely, the cover 3 is generally in the form of a pot, like the peripheral wall 10 of the crucible 2 in the example shown, and is essentially constituted by a circularly symmetrical body of revolution about the axis 4.

This shape is defined in particular by a tubular peripheral wall 18 defined respectively towards the axis 4 and going away therefrom by inner and outer peripheral faces 19 and 20 respectively, both of which are circularly frustoconical about the axis 4 and converge upwards at the same angle (not referenced) relative to said axis 4, and by a flat end wall 21 defined respectively underneath and on top, i.e. respectively towards the inside of the crucible 2 and towards the outside thereof, by faces that are plane and perpendicular to the axis 4, i.e. respectively an inner face 22 and an outer face 23. Thus, the cover 3 defines a downwardly open cavity 52 in free communication with the thermite reaction chamber 15 so as to co-operate therewith to define the above-mentioned closed volume in which the fumes given off during the thermite reaction can expand.

Figure 2:
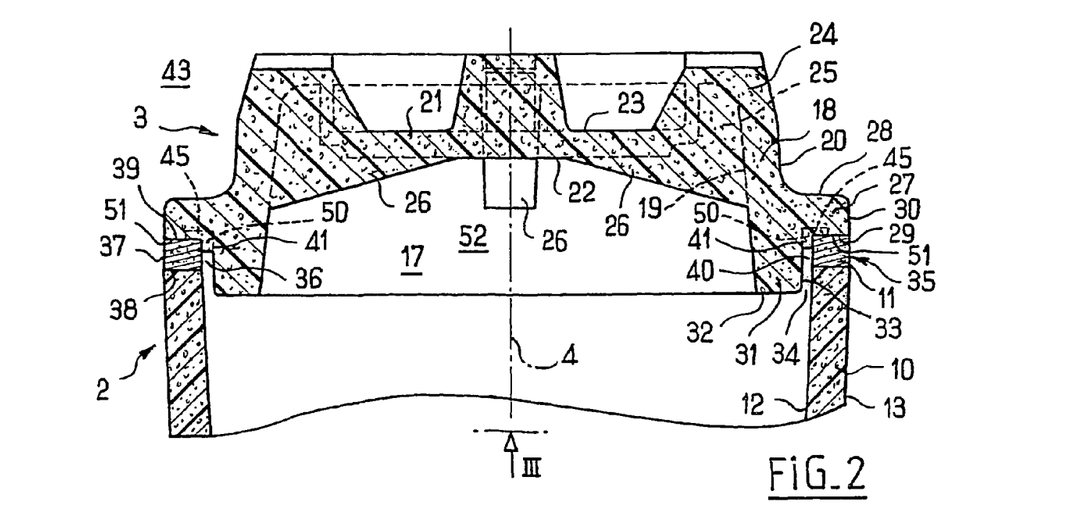
FIG. 2 is a view analogous to that of FIG. 1, showing a detail of the cover.

On going away from the axis 4, as shown diagrammatically in FIG. 1, the faces 22 and 23 may connect directly with the inner peripheral face 19 and the outer peripheral face 20 respectively of the wall 18; however, and preferably, as shown in FIG. 2, the inner face 22 connects with the inner peripheral face 19 via a peripheral groove 25 that is circularly annular about the axis 4, while the outer face 23 is connected to the outer peripheral face 20 via an upwardly projecting annular bead 24 receiving the groove 25.

In addition, in particular for reasons of making the cover 3 sufficiently strong, rectilinear ribs 26 extending radially relative to the axis 4 and regularly distributed angularly about the axis, e.g. four such ribs, can be provided in relief on the inner face 22 of the end wall 21 and on the inner peripheral wall 19 of the wall 18, passing through the groove 25.

Like the groove 25, these ribs 26 present the advantage of increasing the surface area of the cover 3 that is in contact with the fumes given off during the thermite reaction inside the chamber 15, and thus of increasing the capacity of the inner faces 19 and 22 to capture dust and projected particles.

Going downwards, i.e. away from its connection with the end wall 21, the outer peripheral wall 18 is connected to an annular rim 27 of the cover 3, which rim 27 is circularly symmetrical about the axis 4 and projects away from the axis on the peripheral wall 18.

More precisely, the rim 27 is defined upwards and downwards by respective plane annular faces that are circularly symmetrical about the axis 4 and perpendicular thereto, i.e. specifically a top face 28 which is connected directly to the outer peripheral face 20 of the peripheral wall 18 on going towards the axis 4, and a bottom face 29 which is connected indirectly to the inner peripheral face 19 of the peripheral wall 18 when going towards the axis, as explained below. When going away from the axis 4, the faces 28 and 29 are connected to each other by an edge face 30 that is approximately circularly cylindrical about the axis 4 and that faces away therefrom, the edge face 30 nevertheless being slightly conical so as to converge upwards like the outer peripheral face 20 of the peripheral wall 18 so as to make the cover 3 easier to fabricate by molding when, as is preferred, the cover 3 is made of sand agglomerated by means of a hydrophobic resin.

Where it connects with the bottom face 20, the edge face 30 presents a diameter about the axis 4 that is substantially identical to the diameter of the connection between the outer peripheral face 13 of the peripheral wall 10 of the crucible 2 and the top edge 11 of said wall 10, thus also defining the maximum diameter of the bottom face 29. The bottom face also presents a minimum diameter, defined below, which is less than the diameter of the inner peripheral face 12 presented by the peripheral wall 10 where it connects with the top edge 11 of said wall 10, i.e. less than the diameter of the opening 17, with the values of these two diameters nevertheless remaining similar and differing by a few millimeters only for a crucible 2 and a cover 3 that are to be associated with each other to constitute a device for thermite welding of rails.

Under such conditions, the cover 3 in its in-use position rests on the top edge 11 of the peripheral wall 10 of the crucible 2 via the bottom face 29 of its rim 27, in a manner that is indirect, as described below.

While the outer peripheral face 20 of the peripheral wall 18 of the cover 3 terminates downwardly, where it joins the top face 28 of the rim 27, the inner peripheral face 19 of the peripheral wall 18 extends to a level that is lower than that of the bottom face 29 of the rim 27, thereby defining towards the axis 4 an annular rib 31 that is circularly symmetrical about the axis 4, and that is continuous, projecting downwards relative to the bottom face 29 of the rim 27 and providing the above-mentioned indirect connection of said bottom face 29 to the inner peripheral face 19 of the peripheral wall 18.

The rim 31 is downwardly defined by a bottom face 32 that is circularly annular about the axis 4, plane, and perpendicular to said axis 4, which face 32, on going away from the axis 4, connects the extension of the inner peripheral face 19 of the wall 18 to an outer peripheral face 33 of the rim 31, which rim is circularly frustoconical about the axis 4, converging downwards for the above-mentioned reasons of enabling the cover 3 to be made by molding, and is connected going upwards to the bottom face 29 of the rim 27 via the minimum diameter of said face 29.

Under such conditions, and as shown in FIGS. 1 and 2, the rim 31 engages in the opening 17 of the chamber 15 of the crucible 2 when the cover 3 rests on the top edge 11 of the peripheral wall 10 via the bottom face 29 of the rim 27, but between its outer peripheral face 33 and the inner peripheral face 12 of the peripheral wall 10 of the crucible 2, it leaves circularly annular clearance 34 about the axis 4, which clearance is continuous in a circumferential direction around the axis 4, providing the cover 3 is accurately centered relative to the crucible 2, or else is discontinuous in very localized manner by mutual contact between the faces 33 and 12 in the event of the cover 3 being axially offset to the maximum extent relative to the crucible 2.

This clearance 34 allows the gas produced by the thermite reaction together with any dust that is not captured by the inner faces 22 and 19 of the cover 3 to pass towards the mutual contact between the bottom face 29 of the rim 27 of the cover 3 and the top edge 11 of the peripheral wall 10 of the crucible 2; however the rim 31 between the chamber 15 and said mutual contact constitutes a baffle preventing to a very large extent any of the projected particles passing to said contact.

In order to filter the gas that is still charged with dust and that reaches the contact between the face 29 and the face 11, as mentioned above, this contact is not direct, but, in accordance with the present invention, it takes place via a circularly annular filter lining 35 about the axis 4, which lining is substantially continuous and thus acts as a substantially continuous contact medium between the bottom face 29 of the rim 27 or the bottom face of the cover 3 and the top edge 11 of the peripheral wall 10 of the crucible 2.

This filter lining 35 is advantageously made of a material that is compressible, preferably a fibrous material selected from the group comprising felts of vitreous synthetic fibers, and good results have been obtained in testing using a product of the type sold under its own trademark by the supplier Unifrax Corporation and its subsidiaries, the product being constituted by synthetic fibers that are vitreous, amorphous, and inert, containing magnesium in the form of 19% to 26% MgO, and silica in the form of 72% to 77% $SiO_2$, bonded together by an acrylic latex constituting less than 12%, but these details are given purely by way of non-limiting example, and other ingredients could be selected for the filter lining 35 without thereby going beyond the ambit of the present invention.

The filter lining may be implemented in the form of a ring prefabricated out of such material, or in the form of a strip of such material which is cut to a suitable length and wound so as to form a closed loop, where such examples are not limiting in any way.

When seen in section in any half-plane defined by the axis 4, the filter lining 35 preferably presents a section that is rectangular, as shown, being defined both going towards the axis 4 and going away from the axis 4 by inner and outer circularly cylindrical peripheral faces 36 and 37 both about the axis 4, and of diameters corresponding respectively to the diameter of the inner peripheral face 12 of the peripheral wall 10 of the crucible 2 where it joins the top edge 11, and the diameter presented by the outer peripheral face 13 of said peripheral wall 10 where it joins the same top edge 11. Going upwards and downwards respectively, this rectangular section of the filter lining 25 is defined by a bottom face 38 and a top face 39, both of which are plane and circularly annular about the axis 4 to which they are perpendicular, which faces 38 and 39 interconnect the faces 36 and 37 respectively at the top and at the bottom.

Figure 3:
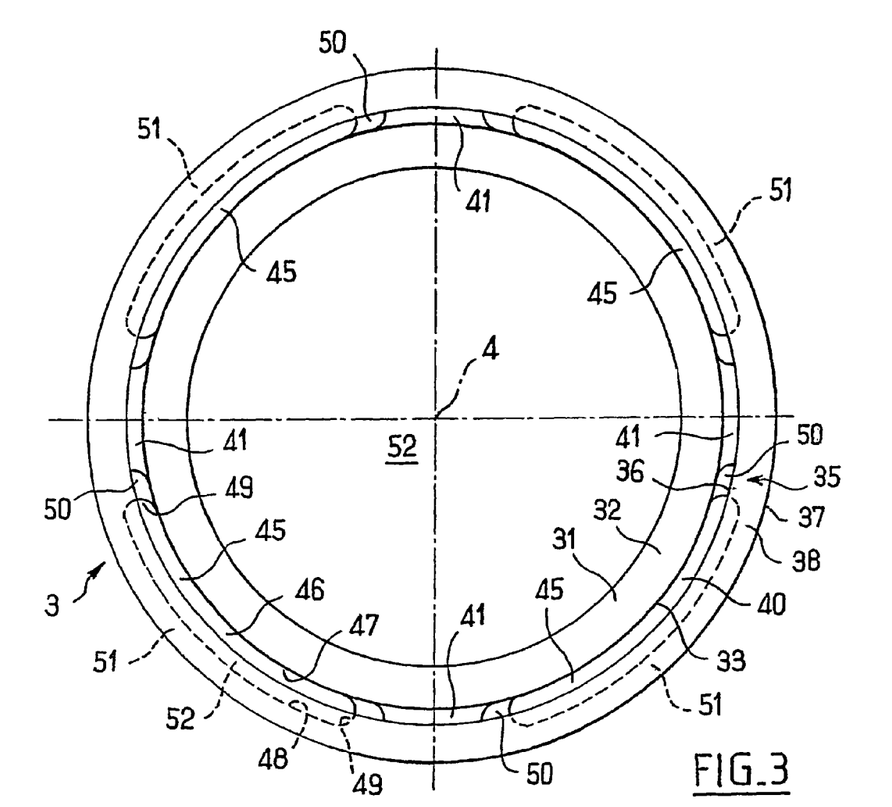
FIG. 3 is a view from beneath of the cover as seen looking along arrow III in FIG. 2, this figure being restricted to the dispositions that play a direct part in filtering.

The filter lining 35 is secured to the rim 27, e.g. by adhesive between its top face 39 and the bottom face 29 of the rim 27, under conditions such that its outer peripheral face 37 extends the edge face 30 of the rim 27 downwards and its inner peripheral face 36 leaves relative to the outer peripheral face 33 of the rim 31 annular clearance 40 that is circularly symmetrical about the axis 4 and continuous both circumferentially around said axis and parallel thereto. While the lining 35 is being secured via its face 39 to the face 29 of the rim 27, this clearance 40 can be preserved, i.e. the inner peripheral face 36 of the filter lining 35 can be kept coaxial relative to the outer peripheral face 33 of the rim 31 of the cover 3, by means of mutually identical centering pegs 41 that are regularly distributed angularly around the axis 4, there being four such pegs being provided on two orthogonal diameters, for example, said pegs projecting in localized manner from the bottom face 29 of the rim 27 away from the outer peripheral face 33 of the rim 31 on going away from the axis 4, each of these pegs 41 presenting, parallel to the axis 4, a dimension that is perceptibly smaller than the dimension between the faces 38 and 39 of the lining 35 to said axis, and each of the pegs 41 presenting circumferentially relative to the axis 4 a dimension that is small relative to that of the face 36 of the lining 35.

Thus, when the cover 3 is rested via the lining 35, i.e. via the bottom face 38 of the lining, on the top edge 11 of the peripheral wall 10 of the crucible 2, the clearance 40 is established with greater or lesser accuracy so as to extend the clearance 34 upwardly, such that the entire face 36 of the lining 35 (ignoring the very localized pegs 41) is exposed to the gas and the dust rising through the clearance 34 from the chamber 15, as represented by arrows 42 in FIG. 1, the filter thus retaining the dust being transported by the gas, making it possible for the gas to escape to ambient air 3 in de-dusted form, as represented by arrows 44 in FIG. 1.

Naturally, the ability of the filter lining 35 to pass gas while retaining dust, is a function of its density, its dimensions, and the extent to which it is compressed by the weight of the cover 3. By way of non-limiting example, for a cover 3 weighing about 2.5 daN, good results have been obtained in testing using a felt of the above-identified type for the filter lining 35, the felt having density of 185 $daN/m^3$ for a thickness of 12 mm, measured between the faces 38 and 39 in the absence of the lining 35 being compressed, and for a lining having a width of 30 mm measured between the faces 36 and 37 and in the absence of the lining 35 being compressed, i.e. corresponding to the difference in diameter between the inner and outer peripheral faces 12 and 13 of the peripheral wall 10 of the crucible 2 where they join the top edge 11 of said wall 10. Nevertheless, that is merely a non-limiting example, and other values could be selected, in particular in association with materials other than the above-identified material, and without that going beyond the ambit of the present invention.

In any event, the distance between the faces 38 and 39 is such that both before compression of the filter lining 35 between the bottom face 29 of the rim 27 of the cover 3 and the top edge 11 of the peripheral wall 10 of the crucible 2, and after compression between said face 29 and said edge 11 under the effect of the weight of the cover 3, the rim 31 has its bottom face 32 projecting relative to the bottom face 38 of the filter lining 35, as represented at H in FIG. 1, so as to make possible the above-mentioned mutual engagement effect of the rim 31 of the cover 3 inside the opening 17 of the chamber 15 of the crucible 2.

It should be observed that unless the cover 3 is maximally misaligned relative to the crucible 2, leading to very localized direct contact between the outer peripheral face 33 of the rim 31 of the cover 3 and the inner peripheral face of the peripheral wall 10 of the crucible 2, contact between the cover 3 and the crucible 2 takes place solely via the filter lining 35, such that when the cover 3 and the crucible 2 are made of sand agglomerated by means of a hydrophobic resin, all sand-on-sand contact is avoided, thereby excluding any risk of the crucible 2 and the cover 3 being damaged with sand dropping into the inside of the chamber 5 from one or the other of them due to such sand-on-sand contact.

Preferably, in order to make it possible to continue using prior art crucibles 2 together with a cover 3 of the invention, no changes are made to the top edge 11 of the peripheral wall 10 of the crucible 2 relative to the dispositions described in EP 0 407 240 B1, so that the contact between the bottom face 38 of the filter lining 35 on said top edge 11 continues to be flat contact.

It would also be possible to make do with such flat contacts between the top face 39 of the lining 35 and the bottom face 29 of the rim 27; however it is preferred to shape the bottom face 29 so as to dissociate localized regions of privileged contact against the top edge 11 of the peripheral wall 10 of the crucible 2 via the filter lining 35, where subjected to extra compression, from localized zones of larger dimensions where said contact force is smaller, and in which the filter lining 35 is consequently less compressed so as to offer on the inside of the chamber 15 and via the inner peripheral face 36, a maximum filter area for capturing dust, and while also offering increased permeability for passing gas.

Thus, in the example shown, the bottom 29 of the rim 27 is locally hollowed out in regular manner and in angular distribution around the axis 4, i.e. in practice between the pegs 41, by means of arcuate cavities 45, with there being as many such cavities as there are pegs 41, i.e. in this case four, each occupying an angular extent that is as large as possible between the pegs 41 about the axis 4.

Each of these cavities 45 is defined by a plane end wall 46 perpendicular to the axis 4, i.e. parallel to the bottom face 29 of the rim 27, being set back towards the face 28 relative to said face 29, to which the end face 46 is connected:

radially closer to the axis 4 by a circularly frustoconical flank 47 about the axis 4, and in practice constituted by a localized extension of the outer peripheral face 33 of the rim 31 going to the end wall 46;

radially further from the axis 4 by a flank 48 that is likewise circularly frustoconical about the axis 4, but of inverse conicity to the flank 47, with a diameter that lies between the respective diameters of the peripheral faces 36 and 37 of the filter lining 35 where said flank 48 joins the bottom face 29 of the rim 27; and in both circumferential directions about the axis 4, by concave flanks 49, e.g. of half-frustoconical shape about respective axes parallel to the axis 4, and flaring from the end wall 46 towards the bottom face 29 of the rim 27.

Thus, between two adjacent flanks 49, defining two adjacent cavities 45, there exists in the circumferential direction on either side of a respective corresponding centering peg 41 a localized zone 50 of the bottom face 29 of the rim 27, which localized zone 50 projects relative to the end walls 46 of the cavities and thus constitutes a contact zone between the cover 3 and the crucible 2 via the filter lining 35, i.e. a localized zone of direct compression of the filter lining 35 between the bottom face 29 of the rim 27 and the top face 11 of the crucible 2, under the weight of the cover 3, whereas in register with each cavity 45, the lining 35 is compressed to a lesser extent or not at all, thereby serving to capture dust and allow gas to pass not only via its inner peripheral face 36, but also via a fraction of its top face 39 that is placed facing the corresponding cavity 45.

The zones 50 are interconnected in the circumferential direction by other zones 51 of the bottom face 29 of the rim 27, which other zones 51 run along the flanks 48 of the cavities 45, i.e. on the outside relative to the axis 4, so that the zones 50 and 51 together leave no discontinuity along a circumferentially continuous marginal zone of the bottom face 29 of the rim 27 of the cover 3 beside the connection between said bottom face 29 and the edge face 30 of said rim 27, thereby also distributing in this location the contact force of the cover 3 on the crucible 2 via the filter lining 35, and thus restricting compression of the filter lining in the zones 50, while nevertheless closing off the cavities 45 going away from the axis 4 so that the gas is constrained to pass through the filter lining 35 in order to leave the chamber 15.

The depth of the cavities 45 measured between their end walls 46 and the zones 50 and 51 of the bottom face 29 of the rim 27 is selected to be sufficient to avoid contact between the face 39 of the lining 35 and an end wall 46 that would interfere with capturing dust also via a portion of the face 39, i.e. to ensure that there remains between the end wall 46 of each cavity 45 and the face 39 of the filter lining 35 sufficient clearance 52 communicating with the clearance 40, in turn communicating with the clearance 34, once the cover 3 has been placed on the crucible 2 via the filter lining 35. In this respect, a depth of a few millimeters is sufficient in the numerically worked example given above.

Nevertheless, it will naturally be understood that in a variant or in addition, dispositions could be provided in the top edge 11 of the peripheral wall 10 of the crucible 2 that are similar to those provided in the rim 27 in order to further increase the area of the lining 35 that can capture dust, specifically by enabling dust to be captured by a fraction of the bottom face 38 of the lining 35.

In general, the person skilled in the art will readily understand that the above-described dispositions, applicable to the cover 3 of the invention being used in association with a crucible 2 for thermite welding of railroad rails, can be subjected to numerous variations, in particular for use in other applications, without thereby going beyond the ambit of the present invention as defined by the accompanying claims.

The invention claimed is:

1. A cover for inhibiting the escape of particles produced by a thermite reaction within a chamber of a crucible having a closed bottom and a circumferential wall that extends upwardly from said bottom, the top of said wall surrounding an opening into said chamber, said cover comprising a filter having a central opening, an inner face, a top face, a bottom face, and an outer face, and said filter bottom face being seatable atop said crucible wall with said filter opening in registration with said opening into said chamber, said filter passing gases but substantially blocking solid particles developed in said thermite reaction, and a lid having a downward facing circumferential flange mountable on said top face of said filter for sealing said chamber to inhibit the escape of particles produced by said thermite reaction while leaving said inner face and outer face of said filter unobstructed for permitting gases produced by said thermite reaction to exit said crucible at the top of said chamber by entering said filter through said inner face, and exiting said filter to the ambient environment through said outer face.

2. A cover according to claim 1, wherein said filter is compressible.

3. A cover according to claim 2, wherein said filter is made of a fiber material selected from the group comprising felts of vitreous synthetic fibers.

4. A cover according to claim 1, wherein the top of said wall and the bottom face of said filter are substantially plane.

5. A cover according to claim 1, comprising a continuous peripheral rim bordering said filter bottom face inside said filter opening and projecting downwardly relative thereto, said rim having outside dimensions that are smaller than corresponding inside dimensions of said opening into said chamber for being received therein.

6. A cover according to claim 5, wherein the filter has inside dimensions that are greater than corresponding ones of said outside dimensions so as to leave annular clearance between said rim and said filter.

7. A cover according to claim 1, generally in the shape of a pot, defining internally a cavity set back upwards relative to said downward facing circumferential flange.

8. A cover according to claim 1, generally in the form of a body of revolution.

9. A cover according to claim 1, adapted for single use, said cover having a lid made of a material comprising sand agglomerated by a binder, said material being easily destroyed after use.

10. A cover according to claim 1 wherein said lid is free of openings other than pores between agglomerated particles from which said lid may optionally be formed.

11. A cover for inhibiting the escape of particles produced by a thermite reaction within a chamber of a crucible having a closed bottom and a circumferential wall that extends upwardly from said bottom, the top of said wall surrounding an opening into said chamber,
said cover comprising
a filter having a central opening, an inner face, a top face, a bottom face, and an outer face, and said filter bottom face being seatable atop said crucible wall with said filter opening in registration with said opening into said chamber, and
a lid having a downward facing circumferential flange mountable on said top face of said filter for sealing said chamber to inhibit the escape of particles produced by said thermite reaction while leaving said inner face and outer face of said filter unobstructed for permitting gases produced by said thermite reaction to exit said crucible at the top of said chamber by entering said filter through said inner face, and exiting said filter to the ambient environment through said outer face,
a continuous peripheral rim bordering said filter bottom face inside said filter opening and projecting downwardly relative thereto, said rim having outside dimensions that are smaller than corresponding inside dimensions of said opening into said chamber for being received therein, said filter having inside dimensions that are greater than corresponding ones of said outside dimensions so as to leave annular clearance between said rim and said filter, and
localized centering means for centering the filter relative to said rim so as to ensure that said annular clearance exists.

12. A cover for inhibiting the escape of particles produced by a thermite reaction within a chamber of a crucible having a closed bottom and a circumferential wall that extends upwardly from said bottom, the top of said wall surrounding an opening into said chamber,
said cover comprising
a filter having a central opening, an inner face, a top face, a bottom face, and an outer face, and said filter bottom face being seatable atop said crucible wall with said filter opening in registration with said opening into said chamber, and
a lid having a downward facing circumferential flange mountable on said top face of said filter for sealing said chamber to inhibit the escape of particles produced by said thermite reaction while leaving said inner face and outer face of said filter unobstructed for permitting gases produced by said thermite reaction to exit said crucible at the top of said chamber by entering said filter through said inner face, and exiting said filter to the ambient environment through said outer face;
a continuous peripheral rim bordering said filter bottom face inside said filter opening and projecting downwardly relative thereto, said rim having outside dimensions that are smaller than corresponding inside dimensions of said opening into said chamber for being received therein;
the filter having inside dimensions that are greater than said outside dimensions so as to leave annular clearance between said rim and said filter;
said downward facing circumferential flange having blind cavities that are circumferentially distributed, so that contact between said downward facing circumferential flange and said filter is locally interrupted, and said cavities communicate with said annular clearance, but are closed at the periphery of said downward facing circumferential flange by the downward facing circumferential flange of the cover making contact with the top face of the filter.

13. A vessel having a chamber for containing a thermite reaction, said vessel comprising
a crucible having a closed bottom and a circumferential wall extending upwardly from said bottom, said wall having a top with an upwardly facing flange,
a filter having a central opening, an inner face, a top face, a bottom face, and an outer face, and said filter bottom face being seatable on said flange of said crucible wall in registration therewith so that said filter and said wall surround said chamber, said filter passing gases but substantially blocking solid particles developed in said thermite reaction, and
a cover having a downward facing circumferential flange mountable on said top face of said filter for covering said chamber to inhibit the escape of particles produced by said thermite reaction while leaving said inner face and outer face of said filter unobstructed for permitting gases produced by said thermite reaction to exit said vessel at the top of said chamber by entering said filter through said inner face, and exiting said filter to the ambient environment through said outer face.

14. A cover for inhibiting the escape of particles produced by a thermite reaction within a chamber of a crucible having a closed bottom and a circumferential wall that extends upwardly from said bottom, the top of said wall surrounding an opening into said chamber,
said cover comprising
a filter having a central opening, an inner face, a top face, a bottom face, and an outer face, and said filter bottom face being seatable atop said crucible wall with said filter opening in registration with said opening into said chamber, and
a lid having a downward facing circumferential flange mountable on said top face of said filter for sealing said chamber to inhibit the escape of particles produced by said thermite reaction while leaving said inner face and outer face of said filter unobstructed for permitting gases produced by said thermite reaction to exit said crucible at the top of said chamber by entering said filter through said inner face, and exiting said filter to the ambient environment through said outer face, said filter being fixed to one of said lid and said crucible and separable from the other of said lid and said crucible upon lifting of said lid away from said crucible for opening said chamber, said lid having sufficient weight to be able, solely under the force of gravity, to prevent dislodgement of said cover by gas pressure from said thermite reaction.

* * * * *